United States Patent [19]
Itoh et al.

[11] Patent Number: 5,704,217
[45] Date of Patent: Jan. 6, 1998

[54] AIR CONDITIONER FOR VEHICLE, IMPROVED FOR FROST DEPOSITION

[75] Inventors: Satoshi Itoh, Kariya; Kunio Iritani, Anjo, both of Japan

[73] Assignee: Nippondenso Co., Ltd., Kariya, Japan

[21] Appl. No.: 715,965

[22] Filed: Sep. 19, 1996

[30] Foreign Application Priority Data

Sep. 22, 1995 [JP] Japan ................... 7-244797
Jul. 11, 1996 [JP] Japan ................... 8-182498

[51] Int. Cl.$^6$ ........................... B60H 1/00
[52] U.S. Cl. .................. 62/150; 62/186; 62/140; 62/324.5; 236/49.3
[58] Field of Search ................ 62/150, 151, 156, 62/140, 186, 160, 155, 80, 82, 81, 272, 282, 324.5; 165/231, 232, 233; 236/49.3

[56] References Cited

U.S. PATENT DOCUMENTS

| | | | |
|---|---|---|---|
| 4,257,795 | 3/1981 | Shaw | 62/150 |
| 4,350,021 | 9/1982 | Lundström | 62/80 X |
| 5,170,635 | 12/1992 | Wruck et al. | 62/151 |
| 5,186,016 | 2/1993 | Nigo | 62/150 |

FOREIGN PATENT DOCUMENTS

A-4-278153  10/1990  Japan .
A-5-77636   3/1993   Japan .

*Primary Examiner*—Harry B. Tanner
*Attorney, Agent, or Firm*—Harness, Dickey & Pierce

[57] ABSTRACT

According to the present invention, in a heating operation where a heating indoor heat exchanger function as a condenser and an outdoor heat exchanger functions as an evaporator, an air amount supplied by a blower is reduced when a predetermined amount of frost is or may be deposited on the outdoor heat exchanger in an outside air introduction mode where an outside air is supplied into a passenger compartment. Accordingly, a heating load is reduced to thereby reduce an endothermic amount in the outdoor heat exchanger. As a result, a frost deposition speed is reduced, and a deposited frost limit is increased, thereby extending a heating operation period.

20 Claims, 9 Drawing Sheets

AIR CONDITIONER FOR VEHICLE, IMPROVED FOR FROST DEPOSITION

CROSS REFERENCE TO THE RELATED APPLICATIONS

This application is based on and claims priority of Japanese Patent Applications Nos. Hei 7-244797 filed on Sep. 22, 1995 and Hei. 8-182498 filed on Jul. 11, 1996, the content of which are incorporated herein by reference.

BACKGROUND OF THE INVENTION

1. Field of the Invention

The present invention relates to an air conditioner for a vehicle, in which a condenser and an evaporator both for forming a refrigeration cycle are employed as an indoor heat exchanger and an outdoor heat exchanger, respectively, so as to heat a passenger compartment of the vehicle by the heat of condensation in the condenser.

2. Description of Related Art

In the air conditioner as described above, the outdoor heat exchanger functions as an evaporator in a heating operation. Accordingly, in the case that the temperature of outside air is low (e.g., near 0° C.) and the humidity is high, frost is deposited on the outdoor heat exchanger. If the heating operation is continued in such a frost deposition condition, the frost is growing with the elapse of the operation time, causing a reduction in heating capacity (coefficient of performance, COP).

To solve such a problem, several inventions have been proposed, as disclosed in JP-A-4-278153 and JP-A-5-77636, for example.

According to the invention disclosed in JP-A-4-278153, when frost is deposited on an outdoor heat exchanger, a defrosting operation is performed in such a manner that the opening degree of an expansion valve is increased and the amount of air to be supplied to an indoor heat exchanger is reduced. In this case, since the opening degree of the expansion valve is increased, both the indoor heat exchanger and the outdoor heat exchanger function as a condenser. Further, since the amount of air to be supplied to the indoor heat exchanger is reduced, a radiated heat amount in the indoor heat exchanger is reduced, and correspondingly a radiated heat amount in the outdoor heat exchanger is increased. In this way, the frost deposited on the outdoor heat exchanger is melted, while keeping on heating the passenger compartment by the indoor heat exchanger.

According to the invention disclosed in JP-A-5-77636, an indoor heat exchanger functions as a condenser and an outdoor heat exchanger functions as an evaporator in a heating operation so as to heat the passenger compartment. In a defrosting operation for the outdoor heat exchanger, by opening a bypass tube for introducing a refrigerant discharged from a compressor directly to the outdoor heat exchanger so as to bypass the indoor heat exchanger and an expansion valve, a part of the refrigerant discharged from the compressor is supplied to the outdoor heat exchanger. In this way, the outdoor heat exchanger then functions as a condenser, and the frost is melted by the heat of condensation in the outdoor heat exchanger.

At this time, since a part of the refrigerant discharged from the compressor flows in the bypass tube, the heating capacity of the indoor heat exchanger is reduced. Accordingly, when the inside/outside air select mode at this time is an outside air introduction mode, the outside air introduction mode is changed to a ⅓ outside air introduction mode. As a result, the amount of cool outside air introduced from an outside air inlet is reduced to about ⅓ of the air amount in the full outside air introduction mode, and warm inside, an amount of which corresponds to the remaining ⅔ of the air amount in the full outside air introduction mode, is introduced. In this way, as compared with the initial heating operation in the full outside air introduction mode, warmer air can be supplied into the passenger compartment.

As a result, although the heating capacity of the indoor heat exchanger is reduced, a reduction in temperature in the passenger compartment can be minimized.

In both inventions as described above, both the indoor heat exchanger and the outdoor heat exchanger function as condensers to defrost the outdoor heat exchanger. Accordingly, heat of the refrigerant discharged from the compressor is radiated in both the indoor heat exchanger and the outdoor heat exchanger. In other words, the radiated heat amount in the indoor heat exchanger decreases according to the radiated heat amount in the outdoor heat exchanger. As a result, the heating capacity for the passenger compartment is reduced, thus decreasing the temperature in the passenger compartment.

In an air conditioner for a home, a heating operation period is generally long (e.g., 10 hours). Accordingly, a defrosting operation for a relatively short period (e.g., 30 minutes) has little influence upon a reduction in temperature of the room. To the contrary, in an air conditioner for a vehicle, the heating operation period corresponds to an operation period of the vehicle, which is much shorter (e.g., one hour) than the heating operation period of the air conditioner for the home. Accordingly, when a defrosting operation is performed for 30 minutes, for example, in the heating operation for such a short time, the influence upon a reduction in the temperature of the passenger compartment becomes greater than that in the case of the air conditioner for the home.

SUMMARY OF THE INVENTION

It is accordingly an object of the present invention to provide an air conditioner for a vehicle, which can extend a heating operation period even when frost has been deposited or may be deposited on the outdoor heat exchanger, by keeping a heating operation in which the indoor heat exchanger functions as a condenser and the outdoor heat exchanger functions as an evaporator, and by reducing a frost deposition speed on the outdoor heat exchanger.

According to the present invention, when it is determined that a predetermined amount of frost has been deposited on the outdoor heat exchanger, or it is determined that conditions that frost may be deposited on the outdoor heat exchanger in a heating operation where an indoor heat exchanger functions as a condenser and an outdoor heat exchanger functions as an evaporator, the above heating operation is continued for at least a predetermined time period, and an amount of ventilating air of outside air sucked from an outside air inlet and blown out into a passenger compartment is reduced from an amount of the ventilating air before the frost deposition has been or may be determined.

The above predetermined time period may be set as a time period until a deposited frost amount on the outdoor heat exchanger reaches a deposited frost limit, that is, until the frost deposition proceeds to such an extent that a temperature of the passenger compartment cannot be maintained at a set temperature even at a maximum rotating speed of a compressor.

An operation and effect of the present invention described above will now be described.

In general, a heating load Q of the passenger compartment means a heat amount required to maintain a temperature of the passenger compartment at a set value (i.e., required heating capacity), and the heating load Q can be expressed as follows:

$$Q = K \times \Delta T + Va \times Cp \times \gamma \times \Delta T \quad (1)$$

where K is the heat transfer coefficient, which is an inherent value in a vehicle, $\Delta T$ is the difference between outside air temperature and temperature of passenger compartment, Va is the ventilating air amount, Cp is the specific heat at a constant pressure of air, and $\gamma$ is the specific weight of air. In Equation (1), the first term ($K \times \Delta T$) in the right side represents heat loss by heat transfer, and the second term ($Va \times Cp \times \gamma \times \Delta T$) in the right side represents heat loss by the ventilation.

As apparent from Equation (1), the heating load Q decreases with a decrease in the ventilating air amount Va. Further, it is generally known that an endothermic amount QE in the outdoor heat exchanger functioning as an evaporator decreases with a decrease in the heating load Q.

The relationship between the frost deposition speed x on the outdoor heat exchanger and the above mentioned endothermic amount QE satisfies the following Equation (2).

$$x \propto QE \quad (2)$$

As apparent from Equation (1) and Equation (2), the endothermic amount QE in the outdoor heat exchanger decreases with a decrease in the ventilating air amount Va, so that the frost deposition speed x also decreases.

On the other hand, the relationship between the size A of the outdoor heat exchanger and the absorbed heat amount QE satisfies Equation (3), and the relationship between the deposited frost limit X and the size A of the outdoor heat exchanger satisfies Equation (4).

$$A \propto QE \quad (3)$$

$$X \propto 1/A \quad (4)$$

The deposited frost limit X is defined as a deposited frost amount in which the temperature of passenger compartment cannot be maintained at the set temperature even at the maximum rotating speed of the compressor as mentioned above.

As apparent from Equation (3) and Equation (4), the deposited frost limit X and the endothermic amount QE may be related with each other by the following Equation (5).

$$X \propto 1/QE \quad (5)$$

As apparent from Equation (5), the deposited frost limit X increases with a decrease in the endothermic amount QE.

Figure 6:
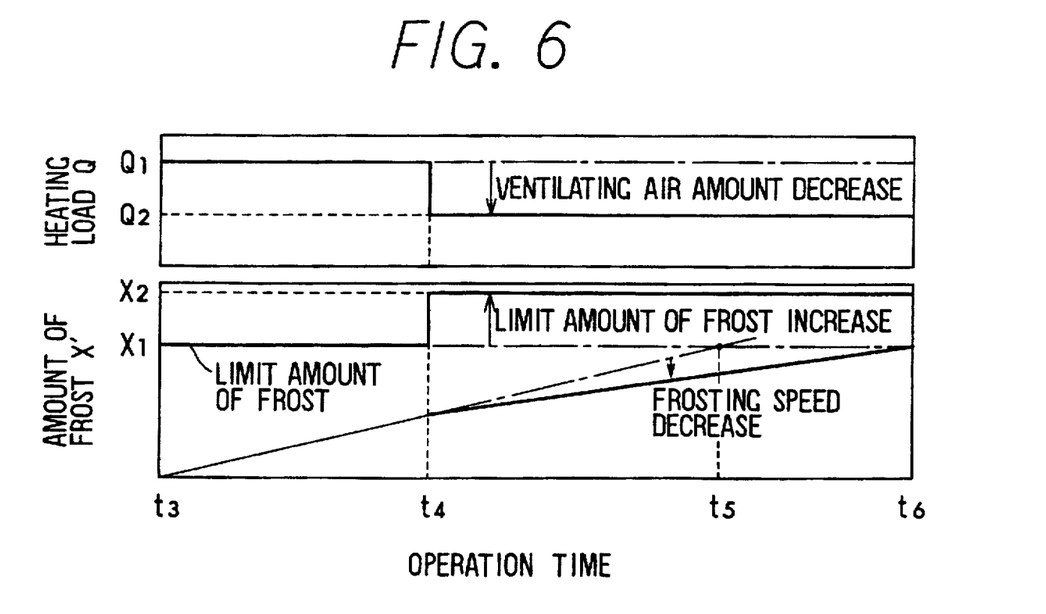
FIG. 6 is a graph showing changes in heating load Q and deposited frost amount X' on the outdoor heat exchanger with time in the first embodiment.

As discussed above, according to the present invention, the following effect can be obtained. As shown in FIG. 6, it is assumed that frost deposition on the outdoor heat exchanger starts at a time t3 in a heating operation with the heating load Q equal to Q1, and then a deposited frost amount X' on the outdoor heat exchanger reaches the predetermined amount at a time t4. At this time t4, the ventilating air amount is reduced while continuing the heating operation, so that the heating load Q becomes Q2 (<Q1).

By reducing the ventilating air amount, the frost deposition speed on the outdoor heat exchanger is reduced, and the deposited frost limit is increased from X1 to X2 as shown by the solid lines in FIG. 6. Accordingly, as compared with the case that the heating operation is continued without reducing the ventilating air amount (as shown by the one-dotted chain lines in FIG. 6), the time until the deposited frost amount X' reached the deposited frost limit can be extended. That is, the time period during which the heating operation is continued can be prolonged.

According to another aspect of the present invention, when it is determined that a predetermined amount of frost has been deposited on the outdoor heat exchanger, or it is determined that conditions that frost may be deposited on the outdoor heat exchanger in a heating operation where the indoor heat exchanger functions as a condenser and the outdoor heat exchanger functions as an evaporator, the above heating operation is continued for at least a predetermined period, and a radiated heat amount in the indoor heat exchanger is reduced from the radiated heat amount before the frost deposition has been determined.

The radiated heat amount in the indoor heat exchanger in the above heating operation may be reduced by any methods such as by reducing an amount of air (outside air or inside air) passing through the indoor heat exchanger or by raising the temperature of the air.

By reducing the radiated heat amount in the indoor heat exchanger for at least the predetermined period after the above determination, a higher-pressure in the refrigeration cycle is increased during the predetermined period, and a lower-pressure in the refrigeration cycle is accordingly also increased. Since the lower-pressure is increased, the temperature of the outdoor heat exchanger functioning as an evaporator is increased. As a result, the frost deposition speed on the outdoor heat exchanger is reduced, and the deposited frost limit is accordingly increased.

Accordingly, as compared with the case that the heating operation is continued without reducing the radiated heat amount, the time until the deposited frost amount on the outdoor heat exchanger reaches the deposited frost limit can be prolonged.

BRIEF DESCRIPTION OF THE DRAWINGS

Additional objects and advantages of the present invention will be more readily apparent from the following detailed description of the preferred embodiments thereof when taken together with the accompanying drawings in which.

DETAILED DESCRIPTION OF THE PREFERRED EMBODIMENTS

A first embodiment of the present invention applied to an air conditioner for an electric vehicle will now be described with reference to FIGS. 1 to 6.

Figure 1:
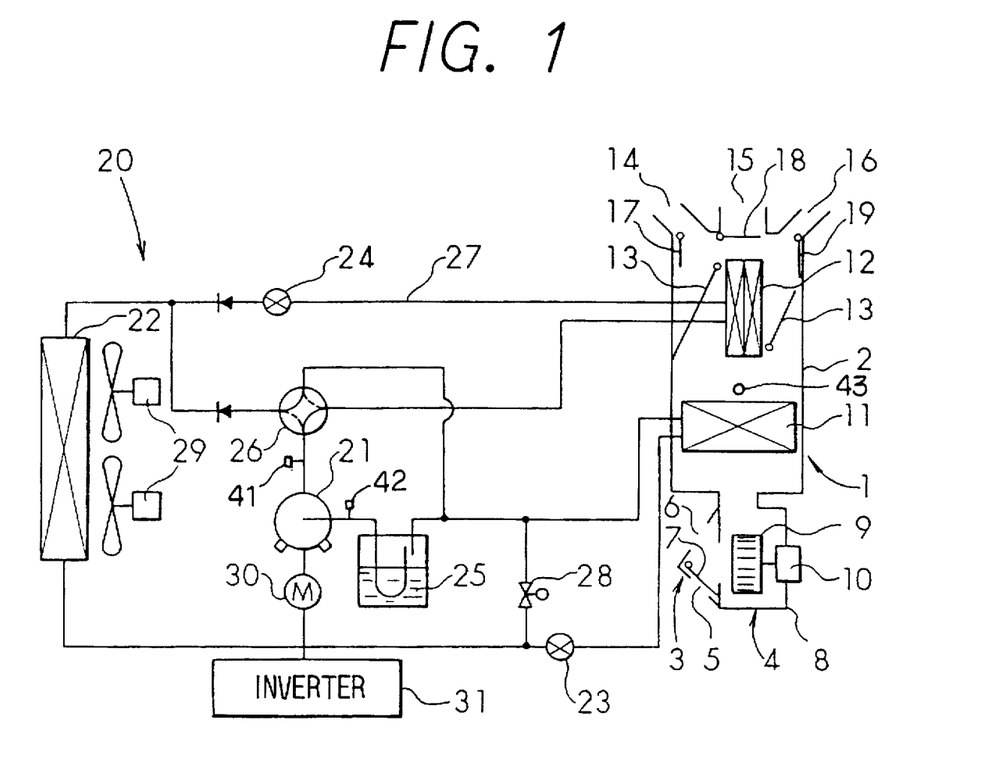
FIG. 1 is a view showing the general configuration of a first embodiment of the present invention.

An air conditioning duct 2 in an air conditioning unit 1 shown in FIG. 1 constitutes an air passage for introducing air into a passenger compartment. Inside/outside air selecting means 3 and blowing means 4 are provided at one end of the air conditioning duct 2, and plural air outlets 14 to 16 are formed at the other end of the air conditioning duct 2.

Figure 3:
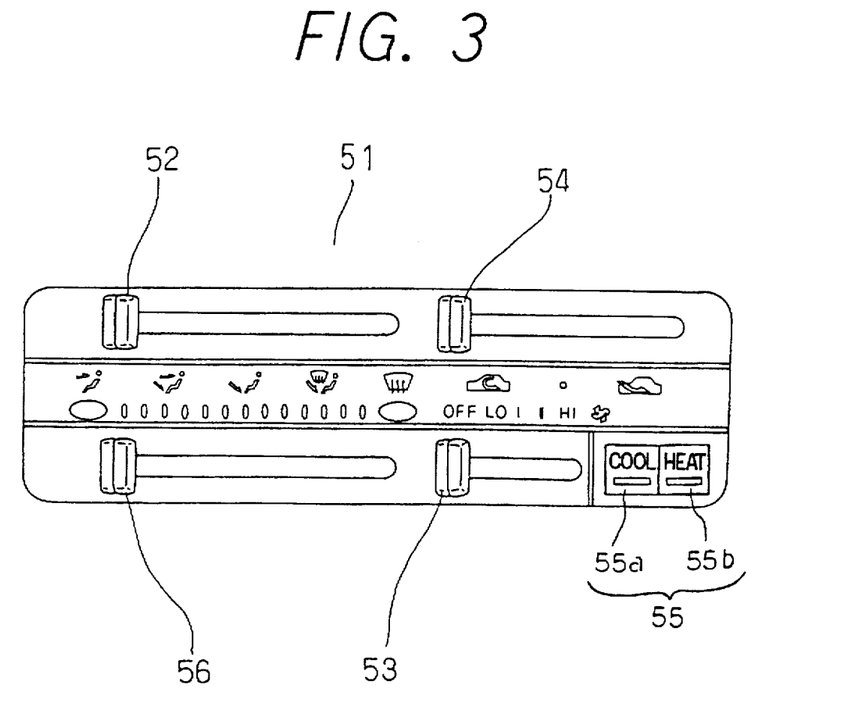
FIG. 3 is a front view of a control panel in the first embodiment.

The inside/outside air selecting means 3 is constructed such that an inside/outside air selector door 7 for selectively opening and closing the air inlets 5 and 6 is provided in an inside/outside air selector box having an inside air inlet 5 for sucking air (inside air) inside the passenger compartment and an outside air inlet 6 for sucking air (outside air) outside the passenger compartment. The inside/outside air selector door 7 is driven by an inside/outside air selector switch 54 as shown in FIG. 3 (which will be described later) via a manual operating mechanism (not shown).

The blowing means 4 functions to generate an air flow in the air conditioning duct 2 from the inside air inlet 5 or the outside air inlet 6 toward the air outlets 14 to 16. More specifically, the blowing means 4 is constructed of a scroll casing 8, a multiblade fan 9 provided in the scroll casing 8, and a blower motor 10 for driving the fan 9.

A cooling indoor heat exchanger 11 is provided in the air conditioning duct 2 at a downstream air side of the fan 9. The cooling indoor heat exchanger 11 is a heat exchanger for forming a part of a refrigeration cycle 20, and functions as an evaporator for dehumidifying and cooling the air in the air conditioning duct 2 by the endothermic action of a refrigerant flowing in the evaporator in a cooling operation mode which will be described later. In a heating operation mode (which will be described later), no refrigerant flows in the cooling indoor heat exchanger 11.

A heating indoor heat exchanger 12 is provided in the air conditioning duct 2 at a downstream air side of the cooling indoor heat exchanger 11. The heating indoor heat exchanger 12 is a heat exchanger for forming a part of the refrigeration cycle 20, and functions as a condenser for heating the air in the air conditioning duct 2 by the heat radiating action of the refrigerant flowing in the condenser in the heating operation mode to be hereinafter described. In the cooling operation mode (which will be described later), no refrigerant flows in the heating indoor heat exchanger 12.

An air mix door 13 is provided in the air conditioning duct 2 at a position adjacent to the heating indoor heat exchanger 12 to adjust an amount of air supplied from the fan 9 and flowing into the indoor heat exchanger 12 for heating and an amount of air supplied from the fan 9 and bypassing the heating indoor heat exchanger 12.

The air outlets 14 to 16 are specifically a defroster air outlet 14 for discharging the conditioned air toward the inner surface of a windshield glass of the vehicle, a face air outlet 15 for discharging the conditioned air toward the upper half of the body of a passenger in the passenger compartment, and a foot air outlet 16 for discharging the conditioned air toward the lower half of the body of the passenger in the passenger compartment. Doors 17, 18, and 19 for opening and closing the air outlets 14, 15, and 16 are provided at an upstream air side of these air outlets, respectively.

The refrigeration cycle 20 is a heat pump type refrigeration cycle for performing cooling and heating of the interior of the passenger compartment by the cooling indoor heat exchanger 11 and the heating indoor heat exchanger 12. In addition to these heat exchangers 11 and 12, the refrigeration cycle 20 is provided with a refrigerant compressor 21, an outdoor heat exchanger 22, an expansion valve 23 for cooling, an expansion valve 24 for heating, an accumulator 25, a four-way valve 26 for selecting a refrigerant flow, and a refrigerant piping 27 for connecting these components with each other. In FIG. 1, reference numerals 28 and 29 denote an electromagnetic valve and an outdoor fan, respectively.

The outdoor heat exchanger 22 is a heat exchanger functioning as a condenser in the cooling operation mode (which will be described later) and functioning as an evaporator in the heating operation mode (which will be described later).

The refrigerant compressor 21 functions to suck, compress, and discharge the refrigerant when driven by an electric motor 30. The electric motor 30 is located integrally with the refrigerant compressor 21 in a sealed case, and is controlled by an inverter 31 to continuously change its rotating speed. The inverter 31 is controlled by changing an electric current thereto with a control device 40 (FIG. 2).

The expansion valve 23 for cooling, functions to expand the refrigerant flowing from the outdoor heat exchanger 22 into the cooling indoor heat exchanger 11 and reduce the pressure of the refrigerant in the cooling operation mode (which will be described later). The expansion valve 24 for heating, functions to expand the refrigerant flowing from the heating indoor heat exchanger 12 into the outdoor heat exchanger 22 and reduce the pressure of the refrigerant in the heating operation mode (which will be described later).

Figure 2:
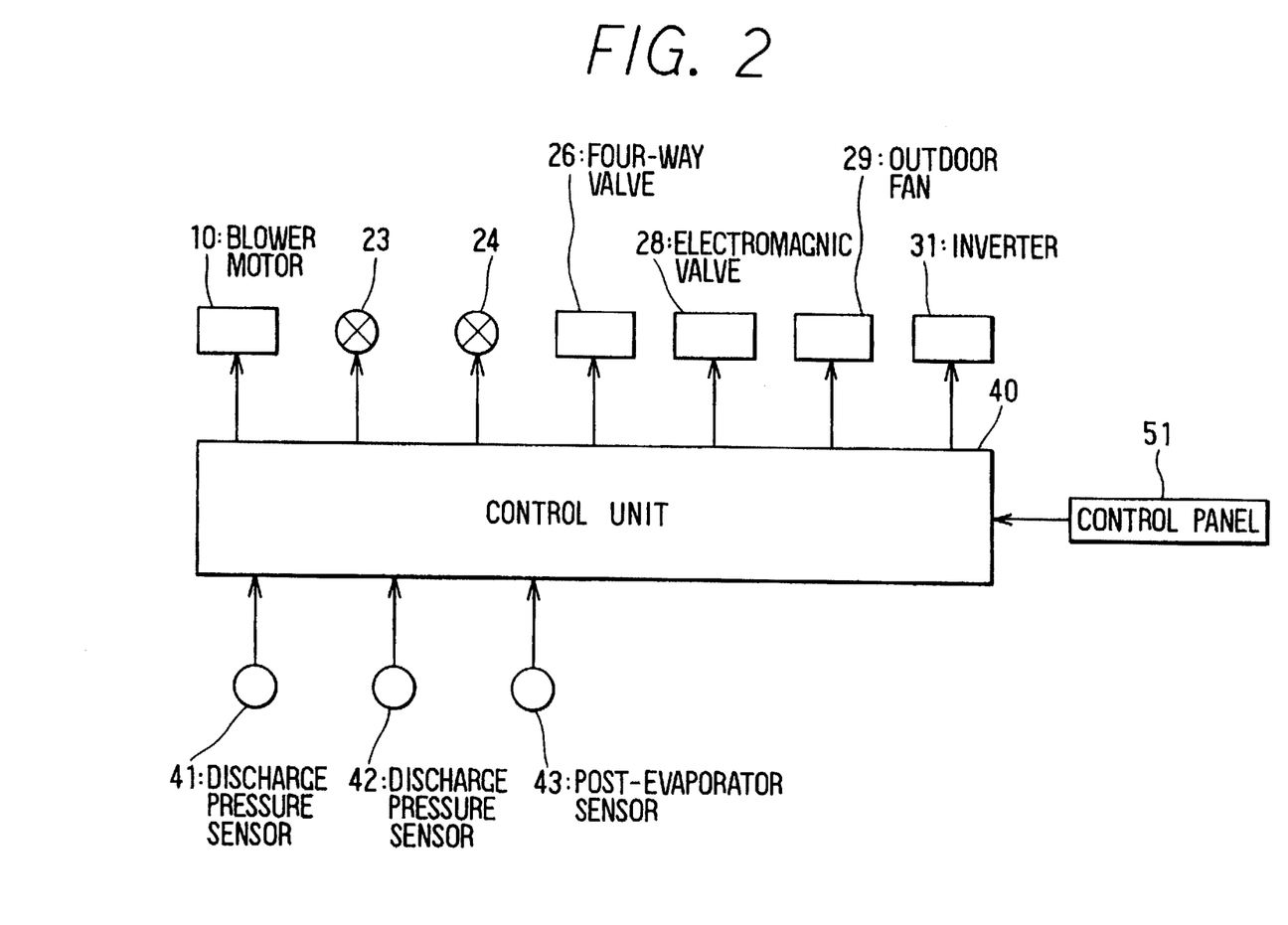
FIG. 2 is a block diagram of a control system in the first embodiment.

As shown in FIG. 2, the control device 40 receives various signals from a discharge pressure sensor 41 for detecting a discharge pressure of the refrigerant discharged by the compressor 21, a suction pressure sensor 42 for detecting a suction pressure of the refrigerant to be sucked by the compressor 21, and a post-evaporator sensor 43 for detecting an air cooling degree in the cooling indoor heat exchanger 11 (more specifically, a temperature of air just after passed through the heat exchanger 11). The control device 40 further receives signals from levers and switches of a control panel 51 provided on the front surface in the passenger compartment.

The control device 40 incorporates a known microcomputer including a CPU, ROM, RAM, input/output ports, etc. (not shown). The signals from the above-mentioned sensors 41 to 43 and the control panel 51 are input through an input circuit (not shown) in an ECU into the microcomputer.

The microcomputer executes a predetermined process (which will be described later) according to the input signals, and controls the blower motor 10, the expansion valve 23 for cooling, the expansion valve 24 for heating, the four-way valve 26, the electromagnetic valve 28, the outdoor fan 29, and the inverter 31 according to the result of the process. The control device 40 is supplied with electric power from a battery (not shown) when a key switch (not shown) in the vehicle is turned on.

As shown in FIG. 3, the control panel 51 is provided with an air outlet mode setting switch 52 for setting an air outlet mode, an air flow setting switch 53 for setting a flow of air blowing into the passenger compartment, an inside/outside air selector switch 54 for setting an inside/outside air select mode, an operation mode setting switch 55 for setting an operation mode of the refrigeration cycle 20, and a temperature setting lever 56 for setting a temperature of air blowing into the passenger compartment. The operation mode setting switch 55 consists of a cooling switch 55a for setting the operation mode of the refrigeration cycle 20 to a cooling operation mode and a heating switch 55b for setting the operation mode of the refrigeration cycle 20 to a heating operation mode.

The control process executed by the microcomputer will now be described with reference to FIG. 4.

Figure 4:
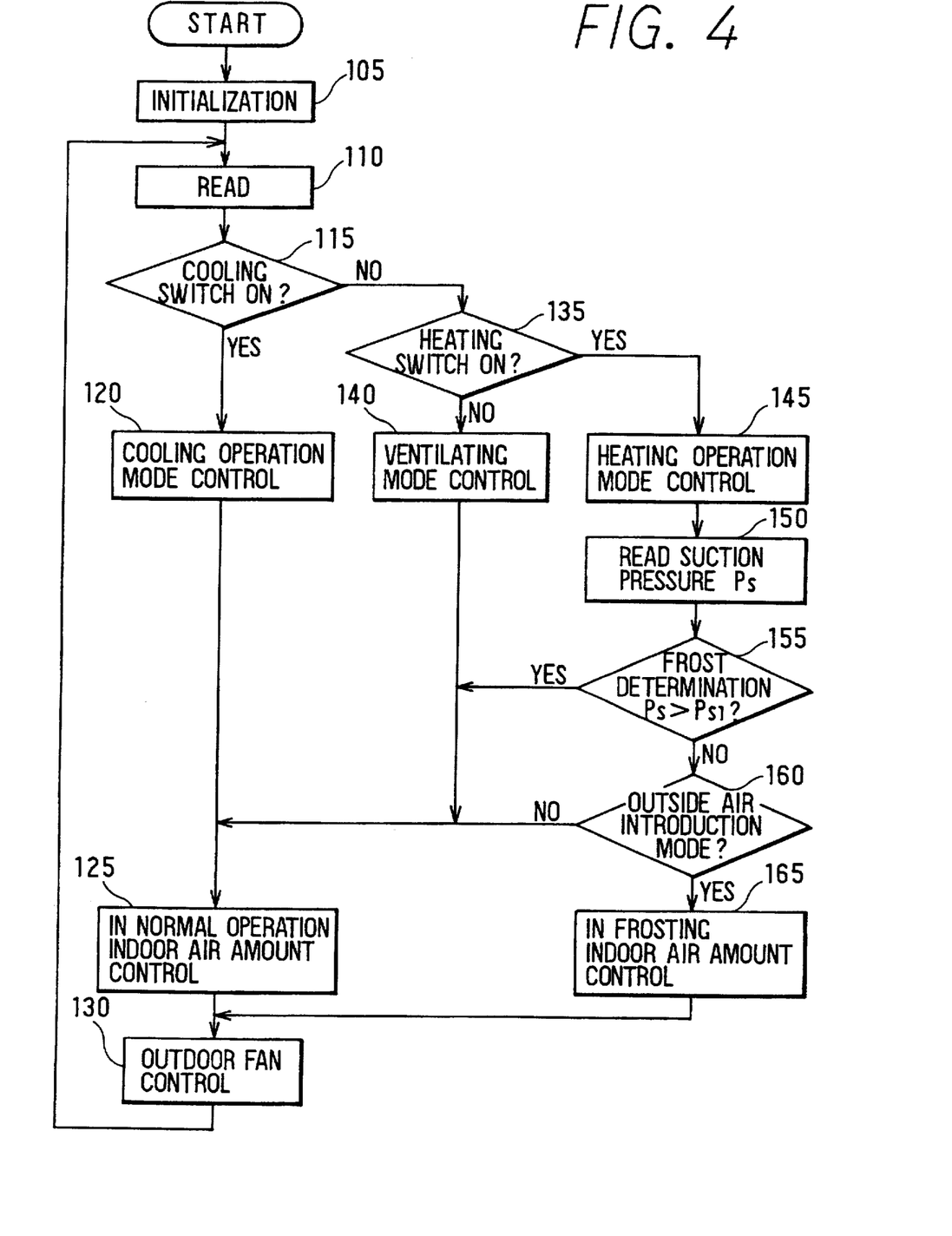
FIG. 4 is a flowchart showing a procedure of a control process executed by a microcomputer in the first embodiment.

When the key switch is turned on to supply electric power to the control device 40, the routine shown in FIG. 4 is started to perform initialization in step 105. Next in step 110, signals from the discharge pressure sensor 41, the post-evaporator sensor 43, and the levers and switches of the control panel 51 are read in. Next in step 115, it is determined whether or not the cooling switch 55a is on. If the determination is YES in step 115, a control for the cooling operation mode is performed in step 120.

In step 120, the four-way valve 26 and the electromagnetic valve 28 are controlled such that the refrigerant flows in the refrigeration cycle 20 in the order of the compressor 21, the outdoor heat exchanger 22, the expansion valve 23 for cooling, the cooling indoor heat exchanger 11, the accumulator 25, and the compressor 21. Further, a target value of an air cooling degree in the cooling indoor heat exchanger 11 (more specifically, a temperature of air just after passed through the heat exchanger 11) is determined according to the set position of the temperature setting lever 56, and the inverter 31 is controlled to change the rotating speed of the compressor such that the detected value from the post-evaporator sensor 43 becomes the above target value.

Next in step 125, a target blower voltage is determined according to the set position of the air flow setting switch 53, and the blower motor 10 is controlled to obtain the target blower voltage.

Next in step 130, the rotating speed of the outdoor fan 29 is controlled. Then, it returns to step 110.

If the determination is NO in step 115, it proceeds to step 135, in which it is determined whether or not the heating switch 55b is on. If the determination is NO in step 135, that is, when neither the cooling operation nor the heating operation has been designated by the operation mode setting switch 55, the compressor 21 is stopped in step 140. Then, the steps 125 and 130 are performed, that is, a blowing mode is set.

If the determination is YES in step 135, it proceeds to step 145, in which the four-way valve 26 and the electromagnetic valve 28 are controlled such that the refrigerant flows in the refrigeration cycle 20 in the order of the compressor 21, the heating indoor heat exchanger 12, the expansion valve 24 for heating, the outdoor heat exchanger 22, the electromagnetic valve 28, the accumulator 25, and the compressor 21. Further, a target value of an air heating degree in the heating indoor heat exchanger 12 (more specifically, a pressure of the refrigerant discharged from the compressor 21) is determined according to the set position of the temperature setting lever 56, and the inverter 31 is controlled to change the rotating speed of the compressor such that the detected value from the discharge pressure sensor 41 becomes the above target value.

Next in step 150, a suction pressure Ps detected by the suction pressure sensor 42 is read in, and next in step 155, it is determined whether or not a predetermined amount of frost has been deposited on the outdoor heat exchanger 22, by comparing the above suction pressure Ps and a reference value Ps1 for frost deposition determination (e.g., 1 Kg/cm2 in this embodiment). If Ps>Ps1, it is regarded that the predetermined amount of frost has not yet been deposited, and it proceeds to step 125. If Ps≦Ps1, it is regarded that the predetermined amount of frost has been deposited, and it proceeds to step 160.

The reference value Ps1 for frost deposition determination will now be briefly described with reference to FIG. 5.

A refrigerant pressure before operating the refrigeration cycle 20 is equal to a saturated pressure Psa of an outside air temperature. The refrigerant pressure starts gradually decreasing from a time t1 when the operation of the refrigeration cycle 20 is started, and becomes Psb at a time t2 when the refrigeration cycle 20 is stabilized. At this time t2, if no frost is deposited on the outdoor heat exchanger 22, the suction pressure Ps becomes constant as shown by a one-dotted chain line in FIG. 5.

Figure 5:
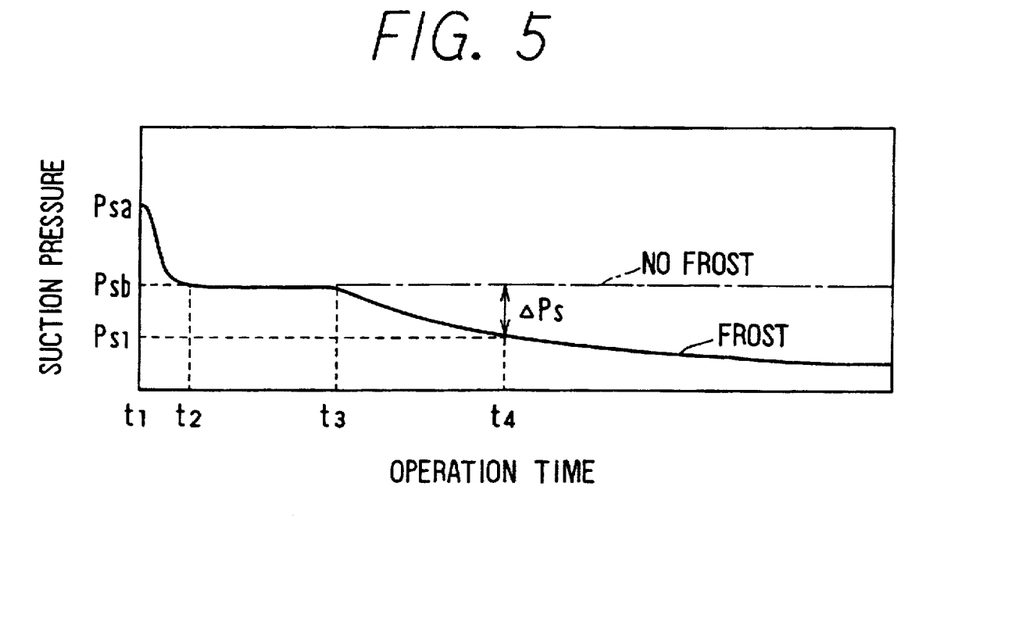
FIG. 5 is a graph showing changes in suction pressure with time in the case where frost is deposited on an outdoor heat exchanger and in the case where no frost is deposited.

However, if frost starts to be deposited on the outdoor heat exchanger 22 at a time t3 as shown by a solid line in FIG. 5, the suction pressure Ps starts gradually decreasing from the time t3. In this embodiment, a value of the suction pressure Ps at a time t4, which is lower than Psb by a predetermined pressure ΔPs, is set as the reference value Ps1 for frost deposition determination.

Referring back to FIG. 4, in step 160, it is determined whether or not the inside/outside air select mode is an outside air introduction mode according to the position of the inside/outside air selector switch 54 read in step 110. If NO in step 160, that is, an inside air circulation mode is determined, it proceeds to step 125 to perform the air flow control in the normal operating condition (without frost deposition).

If the outside air introduction mode is determined in step 160, it proceeds to step 165, in which air flow control in the frost deposited condition is performed. More specifically, in step 165, a corrected blower voltage which is lower by a predetermined value than the target blower voltage determined according to the set position of the air flow setting switch 53 is determined. Then, the blower motor 10 is controlled to obtain the corrected blower voltage, and it proceeds to step 130.

According to this embodiment described above, as shown in FIG. 6, it is assumed that frost deposition on the outdoor heat exchanger 22 starts at a time t3 during the heating operation under the heating load Q expressed by Equation (1) being equal to Q1, and that a deposited frost amount X' on the outdoor heat exchanger 22 becomes the above-mentioned predetermined amount at a time t4. The time t3 and the time t4 shown in FIG. 6 correspond to the time t3 and the time t4 shown in FIG. 5, respectively.

If the outside air introduction mode is set at this time t4, the flow of air blown out into the passenger compartment by the fan 9 is reduced. Accordingly, a ventilating air amount is reduced, so that the heating load Q is reduced to Q2 (<Q1) in accordance with Equation (1).

By reducing the ventilating air amount, a frost deposition speed on the outdoor heat exchanger 22 is also reduced as shown by a solid line in FIG. 6, and a deposited frost limit is increased from X1 to X2.

Accordingly, in the case that the heating operation is continued without reducing the ventilating air amount (as shown by a one-dotted chain line in FIG. 6), the deposited frost amount X' reaches the deposited frost limit X1 at a time t5. On the contrary, according to this embodiment as shown by a solid line, the deposited frost amount X' does not reach the deposited frost limit X2 yet at a time t6 (>t5). In this way, according to this embodiment, the time period during which the heating operation is continued can be prolonged as compared with the case that the ventilating air amount is not reduced.

As described above, in this embodiment, even when the predetermined amount of frost is deposited on the outdoor heat exchanger 22 during the heating operation, without performing defrosting operation in which the outdoor heat exchanger 22 functions as a condenser, the heating operation is continued, and the time period during which the heating operation is continued can be prolonged as long as possible. Accordingly, a desired heating capacity in the passenger compartment can be maintained for an extreme long time without any influences upon a reduction in temperature in the passenger compartment due to the defrosting operation.

Further, in the case that the air conditioner of the present invention is used for an electric vehicle as in this embodiment, an allowable time of travel of the vehicle is limited. Accordingly, by controlling a reduction amount of ventilating air according to the allowable time for running the vehicle, it is possible both to heat the passenger compartment heating and to run the vehicle. That is, in the case that the deposited frost amount becomes the predetermined amount at the time t4 shown in FIG. 6, and the allowable time for running the vehicle is the time t6, the heating operation can be continued during the allowable time for running the vehicle in this embodiment, so that both the passenger compartment heating and the vehicle running can be realized.

A second embodiment of the present invention will be described.

The second embodiment is different from the first preferred embodiment in the drive mechanism for the inside/outside air selector door 7 and the control process executed by the microcomputer in the control device 40. Only these different parts will be described.

The inside/outside air selector door 7 in this embodiment is electrically driven by electrical driving means such as a servo motor rather than by the manual operating mechanism as in the first embodiment.

Figure 7:
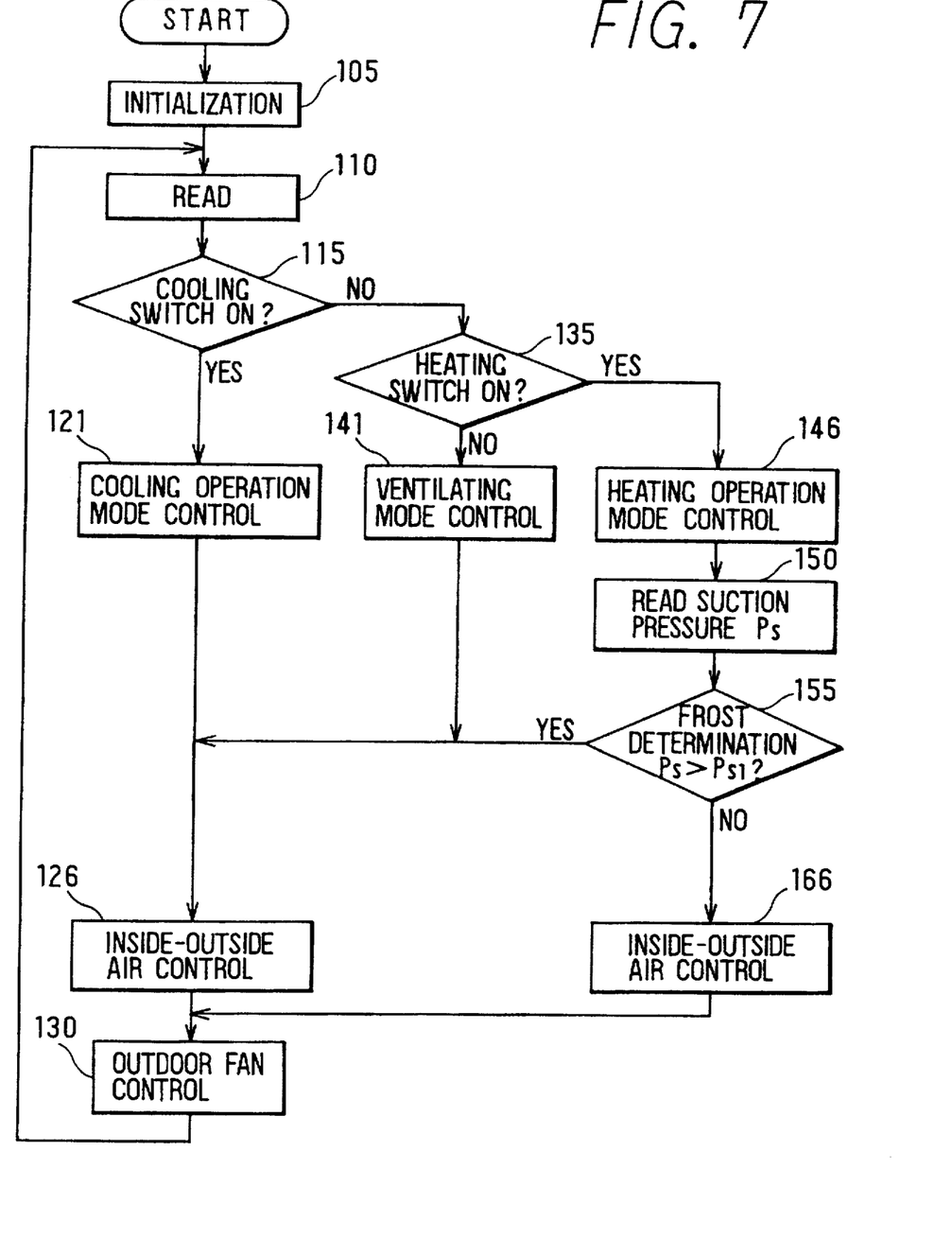
FIG. 7 is a flowchart showing a procedure of a control process executed by a microcomputer in a second embodiment of the present invention.

The control process executed by the microcomputer in this embodiment will now be described with reference to FIG. 7. In FIG. 7, steps for performing the same steps as those in FIG. 4 are denoted by the same reference numerals, and the description thereof will be omitted. Only different steps will be described.

In step 121, step 120 shown in FIG. 4 and step 125 shown in FIG. 4 are simultaneously performed. Next in step 126, a target inside/outside air select mode is determined according to the set position of the inside/outside air selector switch 54, and the above-mentioned electrical driving means is controlled to obtain the target inside/outside air select mode.

In step 141, step 140 shown in FIG. 4 and step 125 shown in FIG. 4 are simultaneously performed. In step 146, step 145 shown in FIG. 4 and step 125 shown in FIG. 4 are simultaneously performed.

In step 166, a mode in which an outside air amount to be introduced is reduced by a predetermined amount than that in the inside/outside air select mode determined according to the set position of the inside/outside air selector switch 54 is determined as a new target inside/outside air select mode, and the electrical driving means is controlled to obtain the new target inside/outside air select mode.

Figure 8:
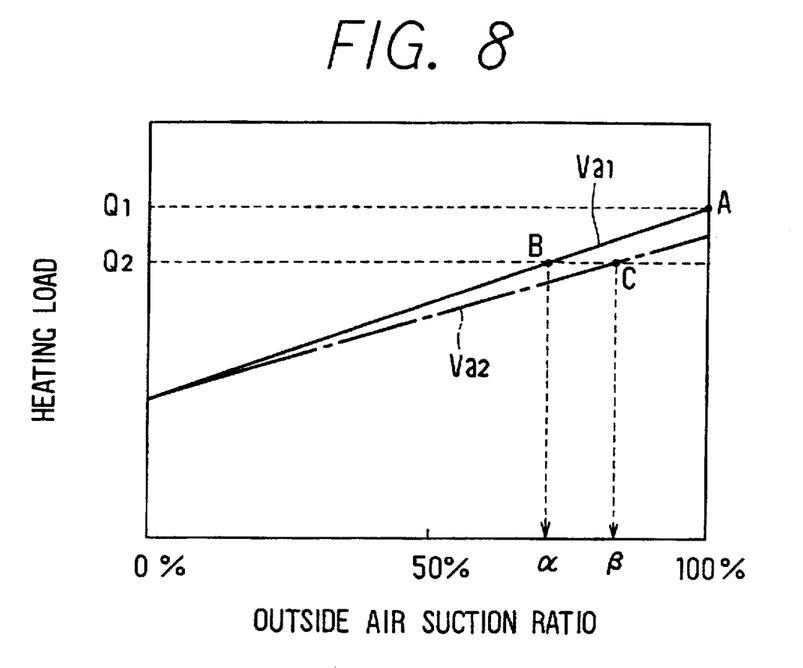
FIG. 8 is a graph for illustrating change amounts in outside air introduction ratio in the second embodiment and a third embodiment of the present invention.

For example, it is assumed that a heating operation is performed in the condition where the outside air introduction mode is set by the inside/outside air selector switch 54 (a ratio of an outside air introduction is 100%) (at a point A in FIG. 8). Then, when a predetermined amount of frost is deposited on the outdoor heat exchanger 22 and the determination is NO in step 155 shown in FIG. 7, the outside air introduction mode is controlled to become a new inside/outside air select mode in which the ratio of the outside air introduction becomes &A% (at a point B in FIG. 8). That is, at this time, the ratio of the outside air introduction is reduced by (100−α)%.

In this way, when the predetermined amount of frost is deposited on the outdoor heat exchanger 22, the outside air introduction amount is reduced by a predetermined amount while continuing the heating operation. Accordingly, the ventilating air amount Va is reduced. As a result, a frost deposition speed is reduced, and a deposited frost limit is increased like the first embodiment. Accordingly, as shown by the solid lines in FIG. 6, the heating operation time in this embodiment can be made longer than that in the case where the outside air introduction amount is not reduced even when frost is deposited (as shown by the dotted chain lines in FIG. 6).

A third embodiment of the present invention will now be described.

In this embodiment, when a predetermined amount of frost is deposited on the outdoor heat exchanger 22, not only an outside air introduction amount is reduced by a predetermined amount, but also a amount of air to be supplied into the passenger compartment is simultaneously reduced by a predetermined amount. That is, the control in step 166 shown in FIG. 7 is modified so that the inside/outside air select mode determined according to the set position of the inside/outside air selector switch 54 is controlled to become a new inside/outside air select mode in which the outside air introduction amount is reduced by a predetermined amount, and that the blower motor 10 is controlled to reduce the air amount to be supplied into the passenger compartment by a predetermined amount.

According to this embodiment, for example, it is assumed that a heating operation is performed in the condition where the inside/outside air select mode is set to the outside air introduction mode (the ratio of the outside air introduction is 100%) and the air amount to be supplied into the passenger compartment is controlled to Val (at a point A in FIG. 8). Then, when a predetermined amount of frost is deposited on the outdoor heat exchanger 22 and the determination is NO in step 155 shown in FIG. 7, the air amount to be supplied into the passenger compartment is controlled to become Va2 (shown by a one-dotted chain line in FIG. 8), and the inside/outside air select mode is controlled to become a new inside/outside air select mode in which the ratio of the outside air introduction becomes β% (at a point C in FIG. 8).

Also according to this embodiment, when a predetermined amount of frost is deposited on the outdoor heat exchanger 22, the outside air introduction amount is reduced by a predetermined amount and the air amount to be supplied into the passenger compartment is also reduced by a predetermined amount as continuing the heating operation. With this control, the heating operation time can be increased as shown by the solid lines in FIG. 6.

A fourth embodiment of the present invention will now be described.

While the frost deposition has been determined in step 155 by the comparison between the suction pressure Ps and the reference value Ps1 in the first to third embodiments, the frost deposition may be determined by the comparison between a change rate of the suction pressure Ps and a predetermined reference value, the comparison between a refrigerant temperature THO in the outdoor heat exchanger 22 and a predetermined reference value, the comparison between a change rate of the refrigerant temperature THO and a predetermined reference value, the comparison between a sucked refrigerant temperature Ts in the compressor 21 and a predetermined reference value, and the comparison between a change rate of the sucked refrigerant temperature Ts and a predetermined reference value.

That is, when a predetermined amount of frost is deposited on the outdoor heat exchanger 22, the conditions on the lower-pressure side of the refrigeration cycle 20 exceed the predetermined reference values. Therefore, it is only essential that when this exceeding is detected, the control in the frost deposited condition as described in the first to third preferred embodiments is performed.

A fifth preferred embodiment of the present invention will now be described.

While the frost deposition has been determined in step 155 according to the conditions on the lower-pressure side of the refrigeration cycle 20 in the first to fourth, the frost deposition may be determined according to the conditions on the higher-pressure side of the refrigeration cycle 20 in consideration of the fact that a change in the conditions on the lower-pressure side is followed by a change in the conditions on the higher-pressure side. For example, the frost deposition may be determined by the comparison between a higher pressure Pd and a predetermined reference value, the comparison between a change rate of the higher pressure Pd and a predetermined reference value, the comparison between an air temperature Tc from the heating indoor heat exchanger 12 and a predetermined reference value, and the comparison between a change rate of the air temperature Tc and a predetermined reference value.

Sixth and seventh preferred embodiments of the present invention will now be described.

Figure 9:
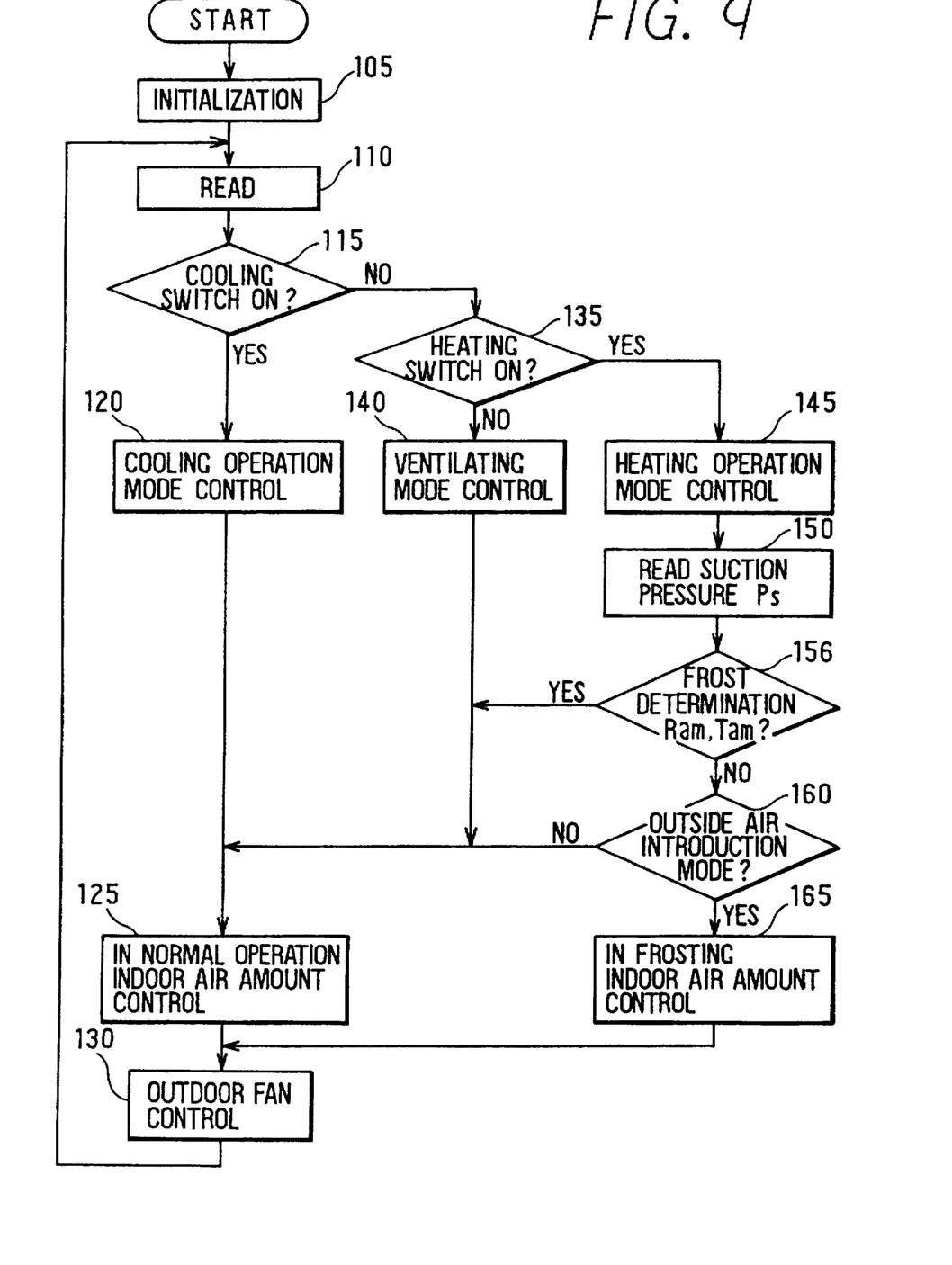
FIG. 9 is a flowchart showing the procedure of a control process executed by a microcomputer in a sixth embodiment of the present invention.
Figure 10:
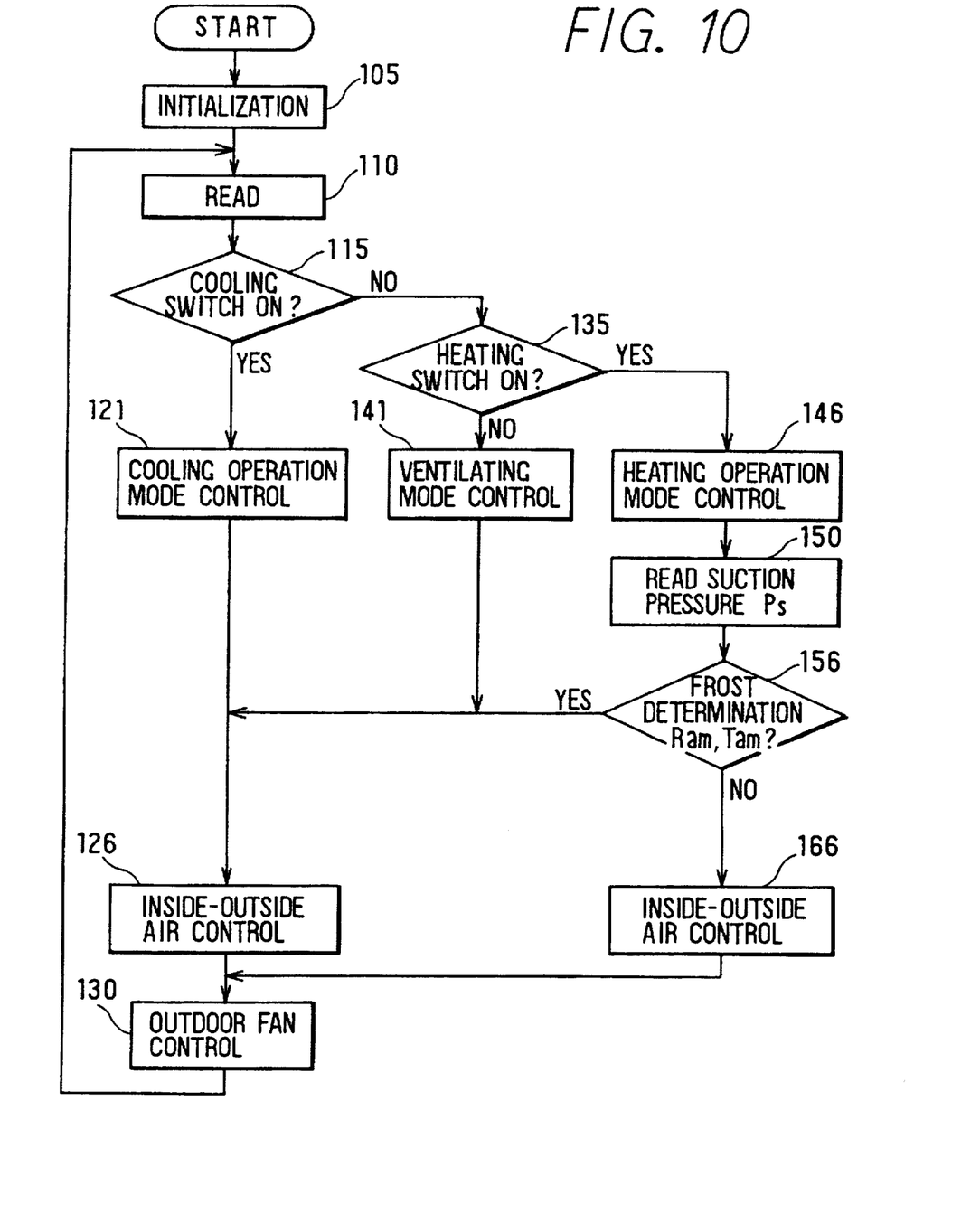
FIG. 10 is a flowchart showing the procedure of a control process executed by a microcomputer in a seventh embodiment of the present invention.

While the frost deposition has been determined in step 155 by determining whether or not a predetermined amount of frost has been deposited on the outdoor heat exchanger 22 in the first to fifth embodiments, the frost deposition may be determined by determining whether or not the conditions that frost may be deposited on the outdoor heat exchanger 22 have been satisfied. That is, in the case that the general configuration is the same as that in the first embodiment, the process by the microcomputer is modified to that shown in FIG. 9 (the sixth embodiment). Further, in the case that the general configuration is the same as that in the second preferred embodiment, the process by the microcomputer is modified to that shown in FIG. 10 (the seventh embodiment).

Figure 11:
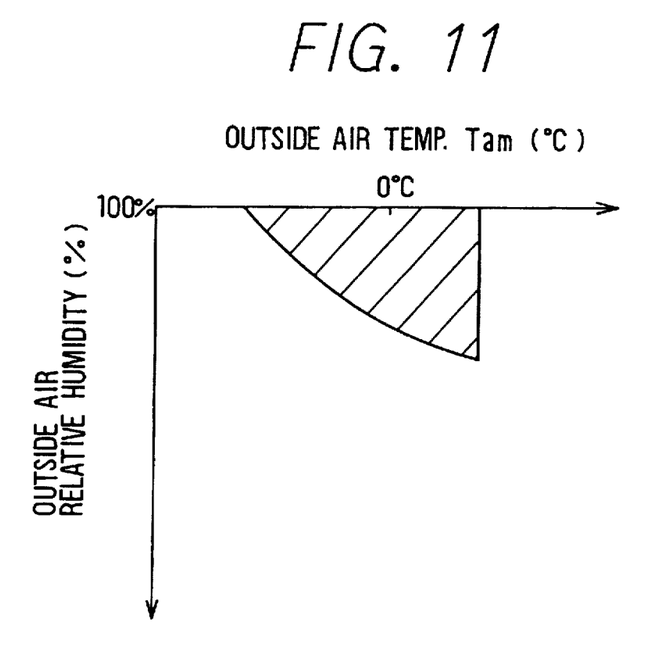
FIG. 11 is a graph showing the conditions that frost may be deposited on the outdoor heat exchanger.

In step 156, it is determined whether or not the conditions that frost may be deposited on the outdoor heat exchanger 22 have been satisfied. If the conditions have been satisfied, step 165 or 166 is performed. More specifically, an outside air humidity sensor for detecting an outside air humidity and an outside air temperature sensor for detecting an outside air temperature are provided. In step 156, it is determined whether or not a detected value Ram from the outside air humidity sensor and a detected value Tam from the outside air temperature sensor satisfy the conditions that frost may be deposited (e.g., a hatched region shown in FIG. 11).

An eighth embodiment of the present invention will now be described.

In each embodiment mentioned above, when it is determined that a predetermined amount of frost has been deposited on the outdoor heat exchanger 22 or the conditions that frost may be deposited on the outdoor heat exchanger 22 have been satisfied, a ventilating air amount is controlled to be reduced while continuing a heating operation. However, when the time for running the vehicle becomes relatively long and the heating operation time is increased, there is a possibility that the deposited frost amount on the outdoor heat exchanger 22 may reach the deposited frost limit.

In this embodiment, when the deposited frost amount on the outdoor heat exchanger 22 has reached the deposited frost limit, a defrosting operation for the outdoor heat exchanger 22 is performed in the same way as the conventional defrosting operation. That is, according to this embodiment, for at least a predetermined period from the time when the frost deposition is determined to the time when the deposited frost amount reaches the deposited frost limit, the ventilating air amount is controlled to be reduced while continuing the heating operation. After this predetermined period has elapsed, the defrosting operation is performed. Accordingly, as compared with the conventional method such that the defrosting operation is performed immediately after the frost deposition has determined, the time period during which the heating operation is continued can be prolonged much longer according to this embodiment.

A ninth embodiment of the present invention will now be described.

In each embodiment mentioned above, when it is determined that a predetermined amount of frost has been deposited on the outdoor heat exchanger 22 or the conditions that frost may be deposited on the outdoor heat exchanger 22 have been satisfied, the ventilating air amount is controlled to be reduced while continuing the heating operation for at least a predetermined period of time. The method of reducing the ventilating air amount may be replaced by a method of reducing an air amount supplied by the fan 9 in the inside air circulation mode.

In this case, a radiated heat amount in the indoor heat exchanger 12 is reduced. Therefore, a higher pressure in the refrigeration cycle 20 is increased, and a lower pressure in the refrigeration cycle 20 is also accordingly increased. The increase in the lower pressure causes a rise in temperature of the outdoor heat exchanger 22 functioning as an evaporator during a heating operation. As a result, the frost deposition speed on the outdoor heat exchanger 22 is reduced, and the deposited frost limit is accordingly increased.

Accordingly, as compared with the case that the heating operation is continued without reducing the radiated heat amount in the indoor heat exchanger 12, the time period until the deposited frost amount in the outdoor heat exchanger 22 reaches the deposited frost limit can be increased. That is, like each embodiment mentioned above, the time period during which the heating operation is continued can be increased.

Although the predetermined time period is defined as a period from the time when frost deposition is determined to the time when the deposited frost amount reaches the deposited frost limit amount in the eighth and ninth embodiments, the predetermined time period defined in the present invention is not limited thereto.

When the outside air temperature is lower than or equal to a predetermined low temperature, the absolute humidity itself of the outside air is small, so that no frost is deposited on the outdoor heat exchanger 22. In consideration of this fact, a step for determining whether or not the outside air temperature is lower than or equal to the predetermined low temperature may be performed. In this case, when it is determined in this step that the outside air temperature is lower than or equal to the predetermined low temperature, the control in the frost deposited condition (step 165 in FIG. 4 or step 166 in FIG. 7) is not performed.

While the first embodiment employs the two inside/outside air select modes, i.e., the outside air introduction mode where the inside/outside air selector door 7 fully closes the inside air inlet 5 and fully opens the outside air inlet 6, and the inside air circulation mode where the inside/outside air selector door 7 fully opens the inside air inlet 5 and fully closes the outside air inlet 6, three or more inside/outside air select modes may be provided, or an inside/outside air select mode may be linearly controlled.

In these cases, the determination in step 160 may be performed by determining whether or not the inside/outside air select mode selected is the outside air introduction mode, or by determining whether or not the inside/outside air select mode selected is a mode where the inside/outside air selector door 7 opens the outside air inlet 6 in a predetermined amount.

Although the preferred embodiments described above are applied to an air conditioner for an electric vehicle, the present invention may be applied also to an air conditioner for an engine-driven vehicle.

Although the present invention has been fully described in connection with the preferred embodiments thereof with reference to the accompanying drawings, it is to be noted that various changes and modifications will become more apparent to those skilled in the art. Such changes and modifications are to be understood as being included within the scope of the present invention as defined in the appended claims.

What is claimed is:

1. An air conditioner for a vehicle having a passenger compartment, comprising:
    an air duct for forming an air passage in which an outside air inlet is formed at one end thereof and an air outlet communicating with said passenger compartment is formed at the other end;
    blowing means for blowing an air flow from said outside air inlet toward said air outlet; and
    a refrigeration cycle including a compressor for compressing a refrigerant, an indoor heat exchanger provided in said air passage, pressure reducing means for reducing a pressure of said refrigerant, and an outdoor heat exchanger provided outside said passenger compartment, said indoor heat exchanger and said outdoor heat exchanger functioning as a condenser and an evaporator in a heating operation, respectively;
    frost deposition determining means for determining whether or not a predetermined amount of frost has been deposited on said outdoor heat exchanger in said heating operation; and
    control means for controlling an amount of ventilating air which is sucked from said outside air inlet and blown out into said passenger compartment through said air outlet by said blowing means, when said frost deposition determining means determines that said predetermined amount of frost has been deposited on said outdoor heat exchanger, in such a manner that said control means reduces said amount of ventilating for at least a predetermined period from an amount of ventilating air before said predetermined amount of frost deposition has been determined by said frost deposition determining means while keeping said indoor heat exchanger and said outdoor heat exchanger functioning as said evaporator and said condenser, respectively.

2. An air conditioner according to claim 1, wherein said air passage is further formed at said one end with an inside air inlet in addition to said outside air inlet.

3. An air conditioner according to claim 2, further comprising:
    air inlet opening/closing means for selectively opening and closing said inside air inlet and said outside air inlet;
    wherein said control means includes:
    air inlet determining means for determining whether or not said air inlet opening/closing means has opened said outside air inlet; and
    air amount reducing control means for reducing an air amount by said blowing means from an air amount before said predetermined amount of frost deposition has been determined by said frost deposition determining means, when said air inlet determining means determines that said outside air inlet is open.

4. An air conditioner according to claim 2, further comprising:
    air inlet opening/closing means for selectively opening and closing said inside air inlet and said outside air inlet;
    wherein said control means includes:
    air inlet control means for controlling said air inlet opening/closing means so as to reduce a ratio of an outside air introduction in which said outside air inlet is opened by said air inlet opening/closing means, from a ratio of said outside air introduction before said predetermined amount of frost deposition has been determined by said frost deposition determining means.

5. An air conditioner according to claim 1, further comprising:
    lower-pressure side conditions detecting means for detecting conditions on a lower-pressure side of said refrigeration cycle;
    wherein said frost deposition determining means determines whether or not said predetermined amount of frost has been deposited on said outdoor heat exchanger according to said conditions detected by said lower-pressure side conditions detecting means.

6. An air conditioner according to claim 1, further comprising:
    higher-pressure side conditions detecting means for detecting conditions on a higher-pressure side of said refrigeration cycle;
    wherein said frost deposition determining means determined whether or not said predetermined amount of frost has been deposited on said outdoor heat exchanger according to said conditions detected by said higher-pressure side conditions detecting means.

7. An air conditioner for a vehicle according to claim 1, wherein said vehicle is an electric vehicle.

8. An air conditioner for a vehicle having a passenger compartment, comprising:
    an air duct for forming an air passage in which an outside air inlet is formed at one end thereof and an air outlet communicating with said passenger compartment is formed at the other end;

blowing means for blowing an air flow from said outside air inlet toward said air outlet; and a refrigeration cycle including a compressor for compressing a refrigerant, an indoor heat exchanger provided in said air passage, pressure reducing means for reducing a pressure of said refrigerant, and an outdoor heat exchanger provided outside said passenger compartment, said indoor heat exchanger and said outdoor heat exchanger functioning as a condenser and an evaporator in a heating operation, respectively;

frost deposition conditions determining means for determining for determining whether or not conditions that frost may be deposited on said outdoor heat exchanger have been satisfied in said heating operation; and control means for controlling an amount of ventilating air which is sucked from said outside air inlet and blown out into said passenger compartment through said air outlet by said blowing means, when said conditions have been determined by said frost deposition conditions determining means, in such a manner that said control means reduces said amount of ventilating air for at least a predetermined period from an amount of ventilating air before said conditions have been determined by said frost deposition conditions determining means while keeping said indoor heat exchanger and said outdoor heat exchanger functioning as said evaporator and said condenser, respectively.

9. An air conditioner according to claim 8, wherein said air passage is further formed at said one end with an inside air inlet in addition to said outside air inlet.

10. An air conditioner according to claim 9, further comprising:

air inlet opening/closing means for selectively opening and closing said inside air inlet and said outside air inlet;

wherein said control means includes:

air inlet determining means for determining whether or not said air inlet opening/closing means has opened said outside air inlet; and air amount reducing control means for reducing an air amount by said blowing means when said air inlet determining means determines that said outside air inlet is open, from an air amount before said conditions have been determined by said frost deposition conditions determining means.

11. An air conditioner according to claim 9, further comprising:

air inlet opening/closing means for selectively opening and closing said inside air inlet and said outside air inlet;

wherein said control means includes:

air inlet control means for controlling said air inlet opening/closing means so as to reduce a ratio of an outside air introduction in which said outside air inlet is opened by said air inlet opening/closing means, from a ratio of said outside air introduction before said predetermined amount of frost deposition has been determined by said frost deposition determining means.

12. An air conditioner according to claim 8, further comprising:

outside air humidity detecting means for detecting an outside air humidity; and outside air temperature detecting means for detecting an outside air temperature;

wherein said frost deposition conditions determining means determines whether or not said conditions that frost may be deposited on said outdoor heat exchanger have been satisfied according to said outside air humidity detected by said outside air humidity detecting means and said outside air temperature detected by said outside air temperature detecting means.

13. An air conditioner for a vehicle having a passenger compartment, comprising:

an air duct for forming an air passage in which an air inlet is formed at one end thereof and an air outlet communicating with said passenger compartment is formed at the other end;

blowing means for blowing an air flow from said air inlet toward said air outlet; and a refrigeration cycle including a compressor for compressing a refrigerant, an indoor heat exchanger provided in said air passage, pressure reducing means for reducing a pressure of said refrigerant, and an outdoor heat exchanger provided outside said passenger compartment, said indoor heat exchanger and said outdoor heat exchanger functioning as a condenser and an evaporator in a heating operation, respectively;

frost deposition determining means for determining whether or not a predetermined amount of frost has been deposited on said outdoor heat exchanger in said heating operation; and control means for controlling a radiated heat amount in said indoor heat exchanger, when said frost deposition determining means determines that said predetermined amount of frost has been deposited on said outdoor heat exchanger, in such a manner that said control means reduces said radiated heat amount for at least a predetermined period from a radiated heat amount in said indoor heat exchanger before said predetermined amount of frost deposition has been determined by said frost deposition determining means while keeping said indoor heat exchanger and said outdoor heat exchanger functioning as said evaporator and said condenser, respectively.

14. An air conditioner according to claim 13, wherein said air inlet includes an inside air inlet and an outside air inlet.

15. An air conditioner according to claim 14, further comprising:

air inlet opening/closing means for selectively opening and closing said inside air inlet and said outside air inlet;

wherein said control means includes:

air inlet determining means for determining whether or not said air inlet opening/closing means has opened said outside air inlet; and air amount reducing control means for reducing an air amount by said blowing means when said air inlet determining means determines that said outside air inlet is open, from an air amount before said predetermined amount of frost deposition has been determined by said frost deposition determining means.

16. An air conditioner according to claim 14, further comprising:

air inlet opening/closing means for selectively opening and closing said inside air inlet and said outside air inlet;

wherein said control means includes:

air inlet control means for controlling said air inlet opening/closing means so as to reduce a ratio of an outside air introduction in which said outside air inlet is opened by said air inlet opening/closing means, from a ratio of said outside air introduction before said predetermined amount of frost deposition has been determined by said frost deposition determining means.

17. An air conditioner according to claim 13, further comprising:

lower-pressure side conditions detecting means for detecting conditions on a lower-pressure side of said refrigeration cycle;

wherein said frost deposition determining means determines whether or not said predetermined amount of frost has been deposited on said outdoor heat exchanger according to said conditions detected by said lower-pressure side conditions detecting means.

18. An air conditioner according to claim 13, further comprising:

higher-pressure side conditions detecting means for detecting conditions on a higher-pressure side of said refrigeration cycle;

wherein said frost deposition determining means determines whether or not said predetermined amount of frost has been deposited on said outdoor heat exchanger according to said conditions detected by said higher-pressure side conditions detecting means.

19. An air conditioner for a vehicle having a passenger compartment, comprising:

an air duct for forming an air passage in which an air inlet is formed at one end thereof and an air outlet communicating with said passenger compartment is formed at the other end;

blowing means for blowing an air flow from said air inlet toward said air outlet; and a refrigeration cycle including a compressor for compressing a refrigerant, an indoor heat exchanger provided in said air passage, pressure reducing means for reducing a pressure of said refrigerant, and an outdoor heat exchanger provided outside said passenger compartment, said indoor heat exchanger and said outdoor heat exchanger functioning as a condenser and an evaporator in a heating operation, respectively;

frost deposition conditions determining means for determining for determining whether or not conditions that frost may be deposited on said outdoor heat exchanger have been satisfied in said heating operation; and control means for controlling a radiated heat amount in said indoor heat exchanger when said conditions have been determined by said frost deposition conditions determining means in such a manner that said control means reduces said radiated heat amount in said indoor heat exchanger for at least a predetermined period from a radiated heat amount before said conditions have been determined by said frost deposition conditions determining means while keeping said indoor heat exchanger and said outdoor heat exchanger functioning as said evaporator and said condenser, respectively.

20. An air conditioner for a vehicle having a passenger compartment, comprising:

an air duct for forming an air passage in which an air inlet is formed at one end thereof and an air outlet communicating with said passenger compartment is formed at the other end;

blowing means for blowing an air flow from said air inlet toward said air outlet; and a refrigeration cycle including a compressor for compressing a refrigerant, an indoor heat exchanger provided in said air passage, pressure reducing means for reducing a pressure of said refrigerant, and an outdoor heat exchanger provided outside said passenger compartment, said indoor heat exchanger and said outdoor heat exchanger functioning as a condenser and an evaporator in a heating operation, respectively;

frost deposition determining means for determining whether or not a predetermined amount of frost has been or may be deposited on said outdoor heat exchanger in said heating operation; and control means for reducing for at least a predetermined period an amount of ventilating air which is sucked from said air inlet and blown out into said passenger compartment through said air outlet by said blowing means when said frost deposition determining means determines that said predetermined amount of frost has been or may be deposited on said outdoor heat exchanger while keeping said heating operation.

* * * * *

UNITED STATES PATENT AND TRADEMARK OFFICE
CERTIFICATE OF CORRECTION

PATENT NO. : 5,704,217
DATED : January 6, 1998
INVENTOR(S) : Satoshi Itoh et al

It is certified that error appears in the above-identified patent and that said Letters Patent is hereby corrected as shown below:

Title Page, [57] Abstract, line 2, delete "function" and substitute --functions-- therefor Col. 2, line 4, after "inside" insert --air--

Col. 4, line 6, delete "reached" and substitute --reaches-- therefor

Col. 9, line 20, delete "extreme" and substitute --extremely-- therefor

Col. 9, line 29, delete "heating"

Col. 10, line 14, "&A%" should be -- $a$ % --

Col. 10, line 35, delete "a" and substitute --an-- therefor

Col. 10, line 51, "Val" should be --Va1--

Col. 12, line 29, after "has" insert --been--

Col. 15, line 14, claim 8, delete "for determining"

Col. 17, line 44, claim 19, delete "for determining"

Signed and Sealed this

Third Day of November, 1998

*Attest:*

BRUCE LEHMAN

*Attesting Officer*      *Commissioner of Patents and Trademarks*